United States Patent [19]
Shinville et al.

[11] 3,941,359
[45] Mar. 2, 1976

[54] APPARATUS FOR DIRECT REDUCTION OF IRON OXIDES

[75] Inventors: Gerald T. Shinville, Sterling; Linden P. Proeger, Prophetstown, both of Ill.

[73] Assignee: Northwestern Steel and Wire Company, Sterling, Ill.

[22] Filed: Dec. 12, 1974

[21] Appl. No.: 531,883

[52] U.S. Cl. .................................. 266/24; 75/37
[51] Int. Cl.² ...... F27B 9/02; F27B 9/10; F27B 9/12
[58] Field of Search ............... 75/26, 37, 28, 29, 34, 75/36, 38, 40; 266/24 R, 20, 24; 432/210

[56] References Cited
UNITED STATES PATENTS

| | | | |
|---|---|---|---|
| 1,863,507 | 6/1932 | Southgate | 75/40 |
| 3,833,208 | 9/1974 | Andersen | 432/210 |

*Primary Examiner*—M. J. Andrews
*Attorney, Agent, or Firm*—Hill, Gross, Simpson, Van Santen, Steadman, Chiara & Simpson

[57] ABSTRACT

A method of and apparatus for reducing an oxide of iron such as the oxides which occur in mill scale involves mixing particles of the oxide with particles of a carbonaceous reducing agent and passing the resulting mixing through a conduit disposed in the flue of a furnace, the flue gases which pass through the flue having a temperature sufficiently high to cause the reduction of the oxide by the reducing agent.

3 Claims, 3 Drawing Figures

U.S. Patent   March 2, 1976   3,941,359
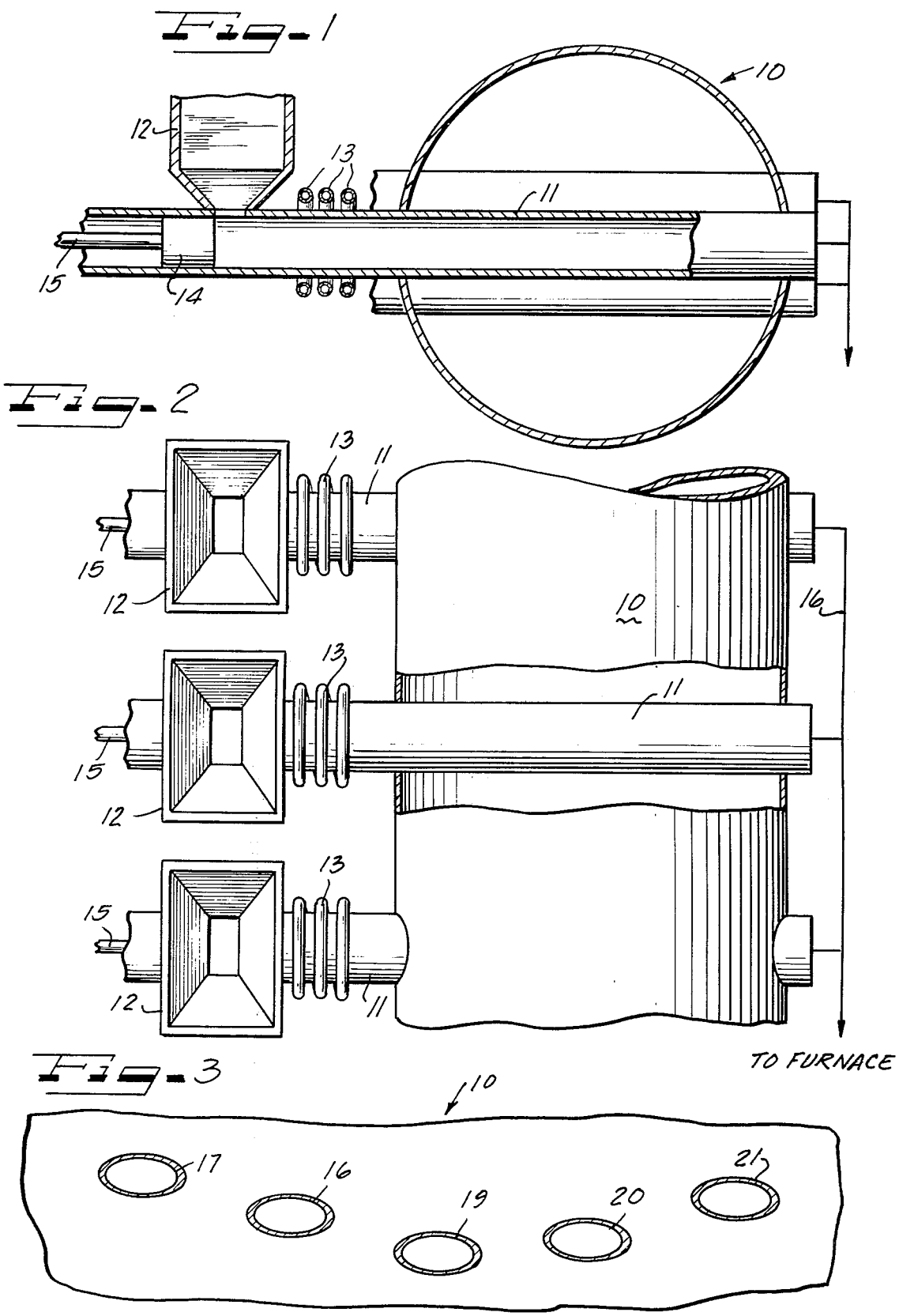

APPARATUS FOR DIRECT REDUCTION OF IRON OXIDES

BACKGROUND OF THE INVENTION

1. Field of the Invention

This invention is in the field of continuous reduction of iron oxides which involves passing a particulate mixture of such oxides with a carbonaceous reducing agent through a conduit which is disposed in the path of hot flue gases for a time and at a temperature sufficient to cause reduction of the iron oxides to a form in which they can be conveniently used as a charge, for example, to an electric furnace.

2. Description of the Prior Art

The present invention has particular applicability to the economic reduction of mill scale to form a commercially usable product. Scale is a coating of oxide formed at high temperatures during rolling or forging operations. The scale varies according to the composition of the steel, the time and temperature of exposure to the oxidizing atmosphere, the nature and constancy of the atmosphere, and the manner of rolling. High pressure, for example, serves to embed the scale into the surface of the steel. When plain carbon steel is heated in an oxidizing atmosphere, the scale is made up of three layers. The layer next to the steel is FeO or a mixture of Fe and $Fe_3O_4$. The outer layer is composed of $Fe_2O_3$ and the middle layer which is the thickest layer consists of $Fe_3O_4$.

This scale has presented a disposal problem in steel plants for many years. In plants having an integrated operation, the scale could be disposed of by using it as a charge in a blast furnace. In the absence of a blast furnace, however, the steel producer usually had to collect the mill scale and sell it to persons who could use it as a low grade source of iron. The temperatures involved and the cost of the reducing agent make hydrogen reduction of mill scale a nonfeasible process commercially.

SUMMARY OF THE INVENTION

This invention relates to an economical process and apparatus for reducing mill scale and other oxides of iron to a form in which it can be readily used in a steelmaking plant, namely, as a product consisting predominantly of iron and having about 1% carbon, with low residuals present. The product of the present invention therefore forms an excellent material for blending into an electric furnace feed to produce steel.

In accordance with the present invention, the mill scale or other oxide source of iron in particulate form is mixed with particles of a cabonaceous reducing agent such as coal. The particulate mixture is then fed continuously through a conduit which extends transversely to the axis of a furnace flue through which hot flue gases are passing. Generally, the gases are at a temperature of about 1,600° to 2200°F (862° to 1192°C). In the preferred form of the present invention, the conduit in which the reaction takes place is generally elliptical in cross-section which has been found to provide better aerodynamic properties as far as the flow of flue gases is concerned and also serves to provide a more uniform temperature distribution throughout the cross-section than would occur in a circular cross-section. The preferred average particle size in the mixture, both for the mill scale and the coal is from 8 to 20 mesh (2.4 to 0.84 mm.)

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 1 is a somewhat schematic view in elevation of an apparatus for charging a mixture of mill scale particles and coal particles into a reaction zone located within a furnace flue;

FIG. 2 is a plan view of the apparatus shown in FIG. 1; and

FIG. 3 illustrates a preferred arrangement of reaction chambers extending axially of the flue.

DESCRIPTION OF THE PREFERRED EMBODIMENTS

Referring to FIG. 1, reference numeral 10 has been applied generally to a flue being from a steel making furnace or the like in which the waste gases passing through the flue are generally at a temperature of 1,600° to 2,200°F (862° to 1192°C). Extending transversely to the axis of the flue 10 is a reaction chamber consisting of a conduit 11 composed of an alloy which can withstand temperatures up to 2200°F (1192°C) or so. Suitable alloys include titanium alloys, high temperature nickel alloys such as "Hastelloy X," or other high temperature alloys. A particulate admixture of an iron oxide such as mill scale and similarly sized particles of coal is sent to the conduit 11 by means of hoppers 12, there being three such hoppers illustrated in FIG. 2. Intermediate the hoppers 12 and the flue 10 may be positioned heating coils 13 for preheating the charge before it enters the high temperature zone in the flue 10. The charge is propelled into the reaction zone by means of a reciprocal piston assembly 14 having a piston rod 15 connected to a suitable prime mover.

The particle size of the mill scale and the coal are not particularly critical although we prefer to use an average particle size in the mixture of from 8 to 20 mesh (2.4 to 0.84 mm.). Actually, it is practical to use particle sizes of from 60 mesh to 1 inch or more.

It is definitely desirable to use a stoichiometric excess of carbon over the iron scale. The presence of excess carbon apparently prevents sticking of the mixture in the reaction tube. We recommend from about 1½ to 5 times an amount of reducing agent above that stoichiometricly required to reduce the iron oxides to metallic iron.

The throughout is adjusted according to circumstances so that there is substantial reduction of the oxides by the time the mixture of coal and iron oxides reaches the outlet of the reaction tubes. For elliptical reaction tubes having a major axis of about 8 feet and a minor axis of about 3 feet disposed in a heating flue having a diameter of 12 feet, we found that a throughput of about 3 lineal feet per hour is adequate.

After the reduction occurs, the reduced iron particles are collected in an outlet conduit 16 and are delivered to a furnace such as an electric furnace for the production of steel. Some agglomeration may occur in the reaction tubes, but this is not harmful in most instances.

FIG. 3 illustrates a preferred arrangement of reaction tubes 17, 18, 19, 20 and 21 within a flue 10. As shown, the cross-section of each of the tubes 17 through 21 is generally elliptical. It has been found that with the use of such cross-sections in the reaction tubes, there is less channeling and therefore the reaction proceeds more smoothly. Furthermore, the elliptical shape is less disruptive to the flow of the high temperature gases, i.e., dynamically it offers less resistance. The use of the elliptical shape has been found to promote better temperature control than would be obtained, for example, in the use of a circular shape. The staggered arrangement of the reaction tubes 17 to 21 as shown in FIG. 3 also provides for a more efficient heat transfer condition existing between the high temperature gases flowing past the reaction tubes 17 to 21 and the materials contained with the tubes.

While the drawings show the process of the invention as a continuous one, it is also possible to operate it as a batch process, if so desired.

The reduction process described above was performed on several different types of feed materials on a laboratory scale. A shaft furnace was constructed to utilize waste heat from a laboratory crucible furnace. Pellets were made up from powdered materials and placed in the shaft furnace for reduction.

In the first heat, we combined one part of coal with one part of an iron sludge containing about 45% iron, and three parts of mill scale. The crucible furnace was operated at a temperature of 2,500° to 2,600°F (1,357° to 1,412°C) for a time of two hours. The charge was at a temperature of 1,300°F (697°C). The iron percentage of the starting material was 54%, and in the final product it was 67.5%.

In another run, the crucible furnace was held at a temperature of 2,150°F (1,165°C). The same type of charge as in the previous example was used and the furnace was operated for two hours. The final product had an iron content of 84.6%.

In another example, a mixture of 78% mill scale and 22% coal was fed to the shaft furnace at a temperature of 1,500° to 2,100°F (807° to 1,137°C). The reaction time was approximately one hour. The starting material had an iron content of 55% which was increased to 71.8% of the final product.

It should be evident that various modifications can be made to the described embodiments without departing from the scope of the present invention.

We claim as our invention:

1. An apparatus for reducing oxides of iron which comprises a large diameter flue for directing high temperature flue gases therethrough, at least one conduit extending transversely through said flue so as to expose its entire periphery to the hot gases passing through said flue, said conduit having a generally elliptical cross-section with the major axis parallel to the axis of said flue, and feeding means for introducing a particulate charge of iron oxide and a carbonaceous reducing agent through said conduit.

2. The apparatus of claim 1 in which a plurality of conduits is arranged in axially spaced staggered relation to the axis of said flue.

3. An apparatus according to claim 1 which also includes a heating means between said feeding means and said flue for preheating said charge in the conduit.

* * * * *